(12) United States Patent
Hung et al.

(10) Patent No.: US 11,853,668 B1
(45) Date of Patent: Dec. 26, 2023

(54) FPGA IMPLEMENTATION INTERLEAVED WITH FPGA OVERLAY ARCHITECTURES FOR EMULATION

(71) Applicant: Synopsys, Inc., Mountain View, CA (US)

(72) Inventors: Ngai Ngai William Hung, San Jose, CA (US); Dhiraj Goswami, Wilsonville, OR (US)

(73) Assignee: Synopsys, Inc., Mountain View, CA (US)

( * ) Notice: Subject to any disclaimer, the term of this patent is extended or adjusted under 35 U.S.C. 154(b) by 756 days.

(21) Appl. No.: 16/579,502

(22) Filed: Sep. 23, 2019

Related U.S. Application Data

(60) Provisional application No. 62/735,350, filed on Sep. 24, 2018.

(51) Int. Cl.
  *G06F 30/34* (2020.01)
  *G06F 11/26* (2006.01)
  *G06F 21/76* (2013.01)
  *G06F 11/36* (2006.01)

(52) U.S. Cl.
  CPC ............ *G06F 30/34* (2020.01); *G06F 11/261* (2013.01); *G06F 11/3652* (2013.01); *G06F 21/76* (2013.01)

(58) Field of Classification Search
  CPC .... G06F 30/34; G06F 11/261; G06F 11/3652; G06F 21/76
  USPC ........................................................ 716/116
  See application file for complete search history.

(56) References Cited

U.S. PATENT DOCUMENTS

| | | | |
|---|---|---|---|
| 8,990,740 B2 | 3/2015 | Zhang et al. | |
| 9,735,783 B2 | 8/2017 | Lin et al. | |
| 2016/0344629 A1* | 11/2016 | Gray | H04L 45/60 |
| 2017/0109466 A1* | 4/2017 | Guerin | G06F 30/331 |
| 2017/0317678 A1 | 11/2017 | Coole et al. | |

OTHER PUBLICATIONS

Chen, L. et al., "Graph minor approach for application mapping on CGRAs," ACM Transactions on Reconfigurable Technology and Systems, 2014, vol. 7, No. 3, pp. 285-292.

Fell, A. et al., "Force-directed scheduling for data flow graph mapping on coarse-grained reconfigurable architectures," International Conference on ReConFigurable Computing and FPGAs, IEEE, 2014, pp. 1-8.

Hung, W.N.N. et al., "Challenges in large FPGA-based logic emulation systems," Proceedings of the 2018 International Symposium on Physical Design, 2018, pp. 1-8.

(Continued)

*Primary Examiner* — Paul Dinh
(74) *Attorney, Agent, or Firm* — Fenwick & West LLP

(57) ABSTRACT

A system and a method are disclosed for emulating a design of an electronic circuit. One or more field programmable gate array (FPGA) overlays are programmed to implement a first set of logic elements of the design of the electronic circuit. A second set of logic elements of the design of the electronic circuit is implemented in one or more FPGAs. The FPGA overlays implementing the first set of logic elements and the FPGAs implementing the second set of logic elements are interconnected to each other. The design of the electronic circuit is then tested using the interconnected FPGA overlays and the FPGAs.

16 Claims, 9 Drawing Sheets

(56) References Cited

OTHER PUBLICATIONS

Kolla, R. et al., "PACE: Processor architectures for circuit emulation," International Parallel Processing Symposium, 1998, pp. 1-6.
Lin, C.Y. et al., "Operation scheduling for FPGA-based reconfigurable computers," International Conference on Field Programmable Logic and Applications, IEEE, 2009, pp. 481-484.
Liu, P. et al., "A Coarse-Grained Reconfigurable Processor for Sequencing and Phylogenetic Algorithms in Bioinformatics," 2011 International Conference on Reconfigurable Computing and FPGAs, 2011, pp. 190-197.
So, H.K.H. et al., "FPGA overlays," FPGAs for Software Programmers, 2016, pp. 285-305.
Yazdanshenas, A.A., "Hardware design and CAD for processor-based logic emulation systems," Electronic Theses and Dissertations, University of Windsor, 2006, No. 7121, pp. 1-128.
Li, X. et al. "FPGA Overlays: Hardware-Based Computing for the Masses." Proceedings of the Eighth International Conference on Advances in Computing, Electronics and Electrical Technology, Feb. 2018, pp. 25-31.

\* cited by examiner

FPGA IMPLEMENTATION INTERLEAVED WITH FPGA OVERLAY ARCHITECTURES FOR EMULATION

CROSS REFERENCE TO RELATED APPLICATIONS

This application claims a benefit of U.S. Patent Application Ser. No. 62/735,350, filed Sep. 24, 2018, the contents of which is incorporated by reference herein.

BACKGROUND

1. Field of Art

The disclosure generally relates to the field of circuit emulation, and more specifically to using field programmable gate array (FPGA) overlay to emulate designs of electronic circuits.

2. Description of the Related Art

Current emulation systems use commercial off-the-shelf FPGAs. Currently emulation systems take a big netlist and partition it into multiple FPGAs. Each FPGA partition will then be placed-and-routed onto the target FPGA. A basic introduction of emulation compile flow is discussed in W. Hung and R. Sun, "Challenges in Large FPGA-based Logic Emulation Systems," in *ACM International Symposium on Physical Design (ISPD)*, Oceanside, California, 2018. There are 2 problems with FPGA-based emulation:
1. FPGA compiling (mostly place-and-route) takes a long time. Typical customer scenarios could easily range from multiple hours to multiple days. This is because there are hundreds of FPGAs in the emulator. Even if all are compiled in parallel, the worst case FPGA will take a long time to place-and-route.
2. FPGA compiling occupies a lot of compute farm resources. Since there are hundreds of FPGAs to place-and-route, and each place-and-route runs in multiple threads with many hours (or many days), and there is a need to launch various strategies in parallel (PARFF strategies), thousands of CPU cores from the computer farm are potentially utilized.

FPGA overlay speed-up the compile time of commercial off-the-shelf FPGAs. FPGA overlay introduce a programmable architecture that is compiled onto an FPGA with place-and-route. To compile a design, the design is mapped onto the programmable architecture. Hence, the FPGA place-and-route is avoided for the design as the architecture is already compiled onto the target FPGA. Examples of FPGA overlay architectures include Virtual FPGAs, Coarse-Grained Reconfigurable Arrays (CGRAs), and Processor-Like Overlays. However, the speed (performance) of these processor-based emulators are lagging far behind FPGA-based emulators.

SUMMARY

A new timeline for compiling FPGA for an emulation system is proposed where all FPGAs initially use overlayed architectures. Initial runtime performance may slow in some embodiments, but the emulation begins immediately. Concurrently, FPGA compile (place and route) is launched. As more and more FPGAs finish place-and-route, they are substituted into the emulator runtime. Hence, same performance may be achieved as in current emulation systems.

An embodiment provides a module using FPGA overlay architectures for emulation.

Another embodiment provides a module using a multi-FPGA emulation system where some FPGAs use FPGA overlay architectures, and some FPGAs (such as those on the critical timing path) do not use overlay.

A third embodiment provides a module using multiple different FPGA overlay architectures for emulation depending on the content and surrounding environment of the partitioned netlist for each FPGA.

A fourth embodiment provides a module with an emulation compiling flow that is broken into the following stages:
  a) A first stage where all FPGAs use FPGA overlay architectures.
  b) A second stage where a subset of FPGAs (such as those on the critical timing path) go directly for FPGA compile place and route (P&R).
  c) A third stage where if some of the FPGA from the second stage finish P&R runtime is relaunched. Adaptively, the system allows the user to re-launch runtime using these non-overlay FPGAs, to achieve better runtime performance.
  d) A fourth stage where critical path FPGAs that have finished P&R, can be taken to runtime.

A fifth embodiment provides a module using FPGA Partial overlay for emulation, such that part of the FPGA has overlay architecture, and the rest of the FPGA is using traditional place-and-routed circuit.

A sixth embodiment provides a module using a set of FPGA overlay architectures for emulation. Embodiments disclosed herein provide:
  a) Sequential folding of carry chain into single (or a few) processing element(s) for the proposed CGRA architecture
  b) Sequential folding of zMem access ports into at most two processing elements for the proposed CGRA architecture.
  c) Programmable Socket for Time-Domain Multiplexing (TDM) that can be configured as either input or output socket.

BRIEF DESCRIPTION OF THE DRAWINGS

The teachings of the embodiments can be readily understood by considering the following detailed description in conjunction with the accompanying drawings.

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

Figure 1:
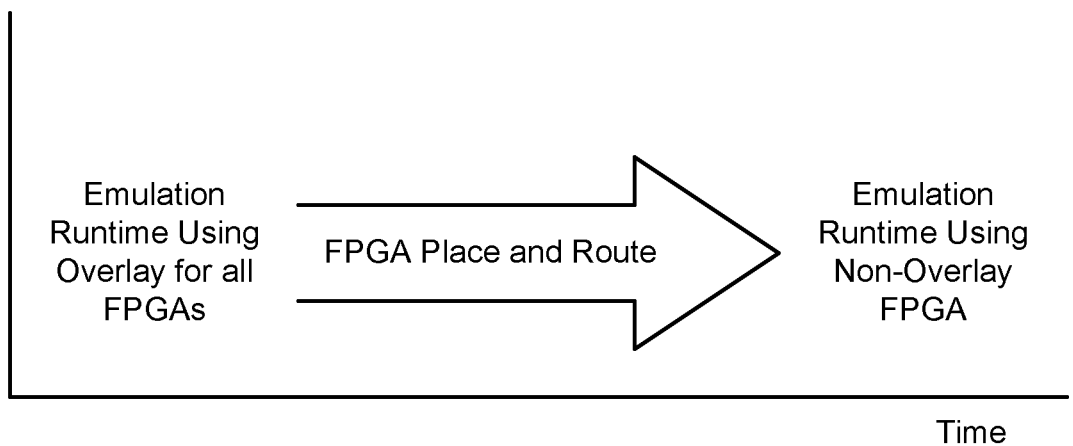
FIG. 1 shows a compile timeline, according to one embodiment.

Figure (FIG. 1 shows a compile timeline, according to one example embodiment. A timeline for compiling FPGA for an emulation system may be as follows:

1. At the beginning, overlay architectures are used for all FPGAs. Although, the overlay architectures will have slow performance compared to place-and-rout FPGAs, the user can immediately launch emulation runtime.
2. In parallel, FPGA compile (place-and-route) is launched. As more and more FPGAs finish place-and-route, the FPGAs using an overlay architecture can be substituted with the place-and-route FPGAs.

Figure 2:
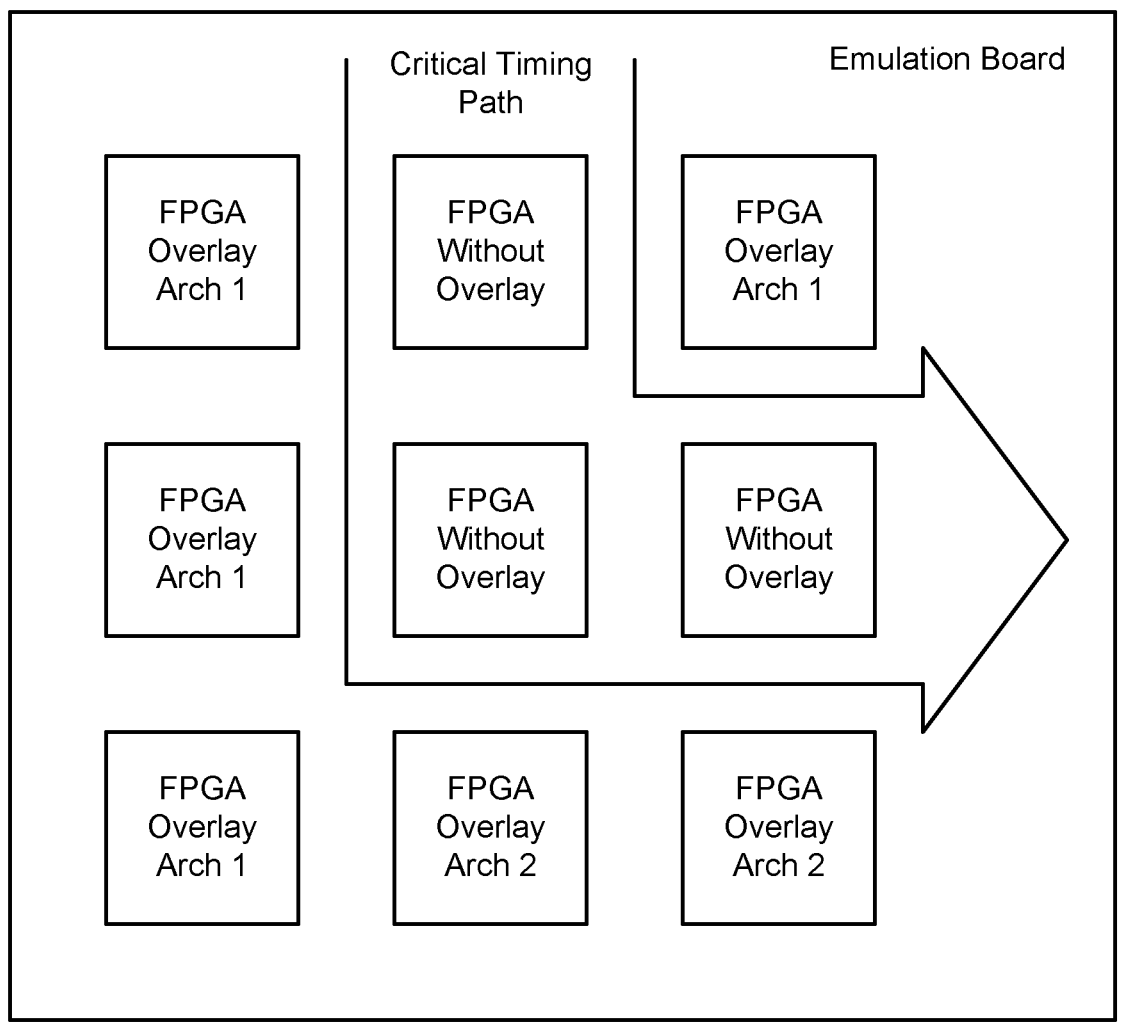
FIG. 2 shows an emulation board, according to one embodiment.

FIG. 2 shows an emulation board, according to one example embodiment. FPGAs with overlay architecture can be used on the emulator mixed with other FPGAs without overlay. Different FPGAs can use different overlay architectures. As shown in FIG. 2, the emulation board uses FPGA overlays having a first architecture (Arch 1) and a second architecture (Arch 2), and FPGAs without overlays. In some embodiments, the critical timing path of the design being tested is implemented using FPGAs without overlays.

This approach alleviates/solves the long compiling time problem by enabling customer to use the overlay FPGAs without waiting for FPGA place and route (P&R). Since there is no urgency to finish all the FPGA P&R as soon as possible, some of the FPGA P&R can be launched sequentially as not all need to be launched in parallel to the compute farm. In addition, non-critical FPGA may not be implemented using P&R as they can simply use overlay. Hence the compute farm usage can be significantly reduced.

Figure 3A:
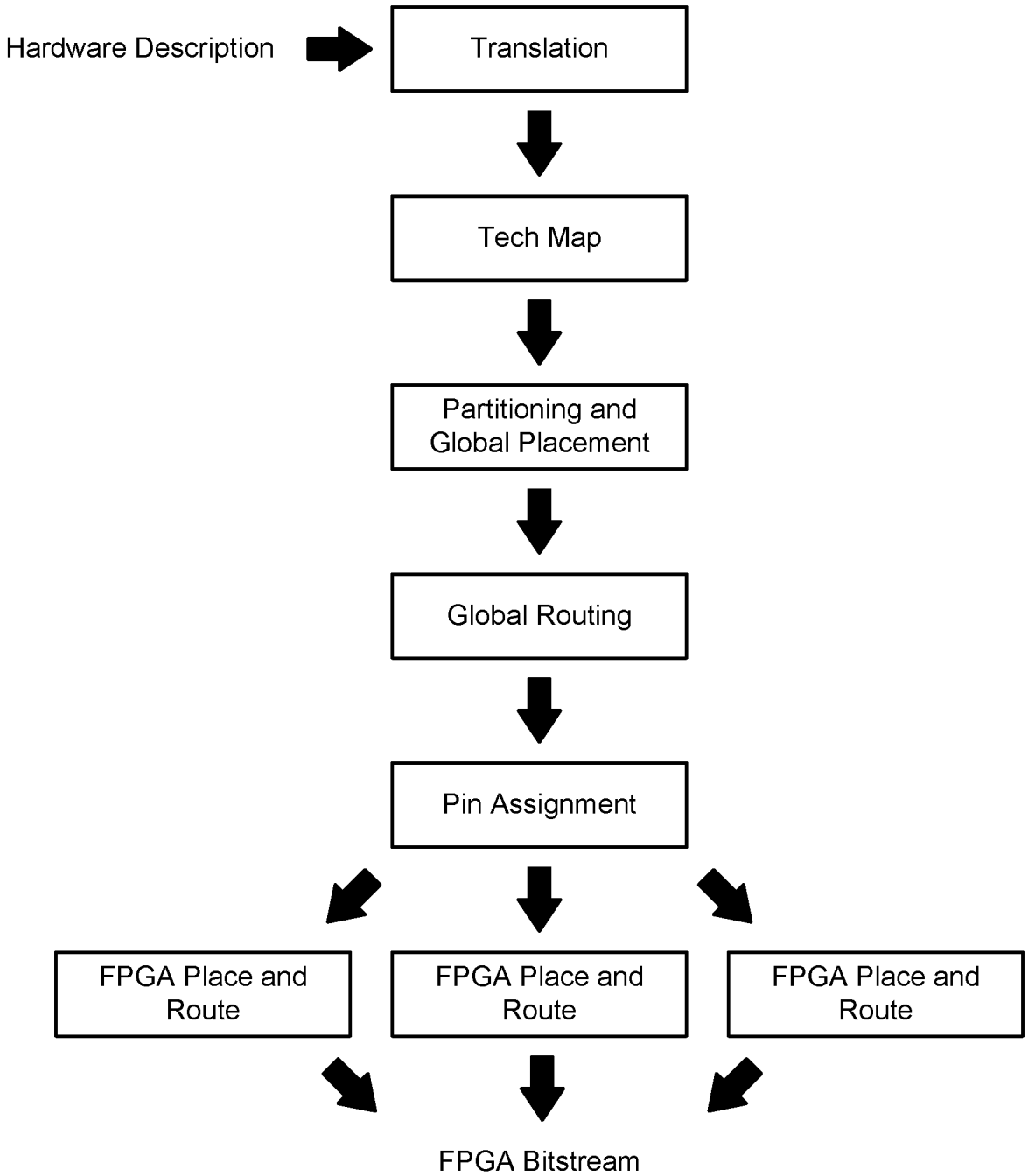
FIG. 3A shows an emulation compile flow yielding a bit level netlist, according to one embodiment.
Figure 3B:
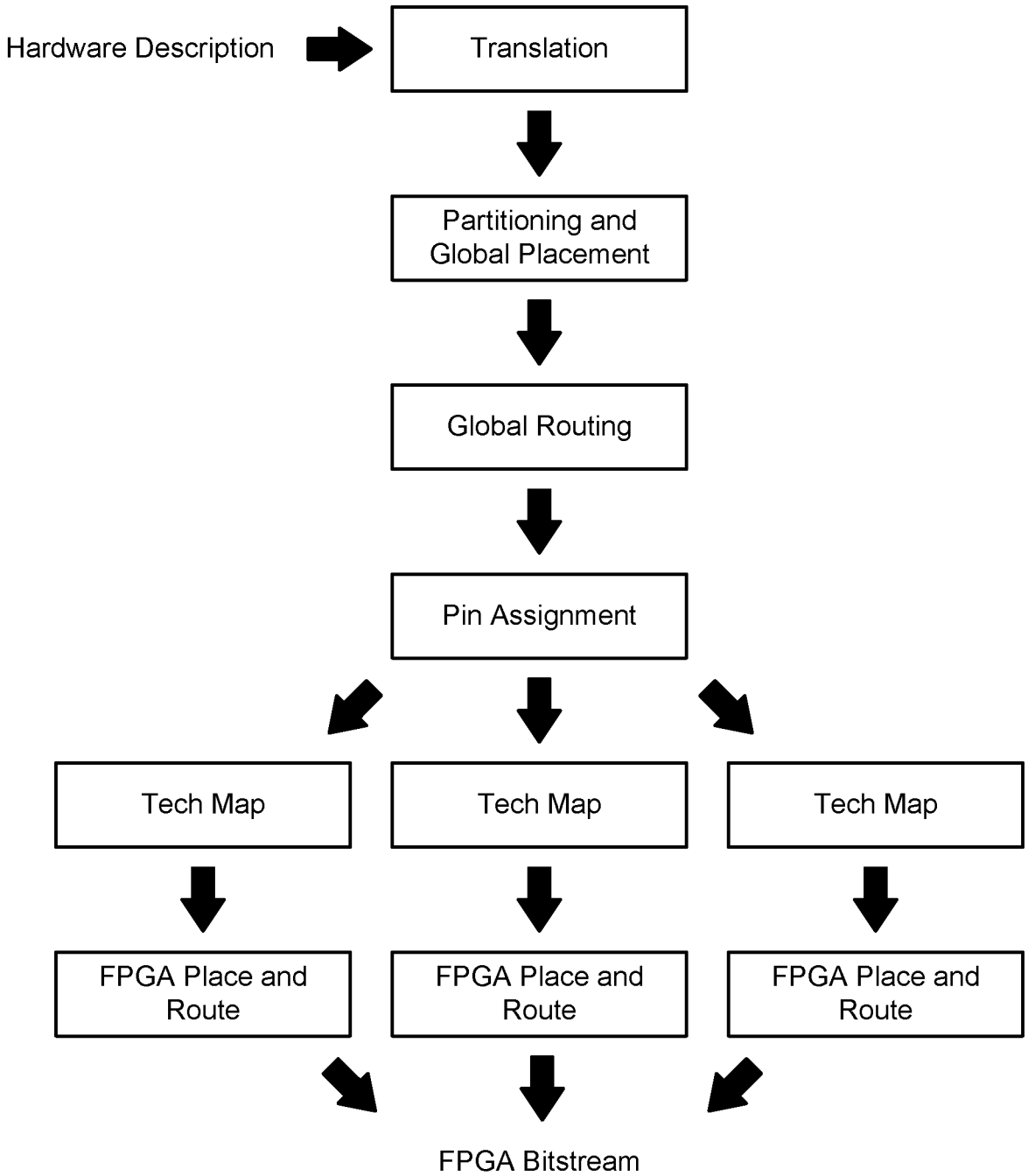
FIG. 3B shows an emulation compile flow yielding a word level netlist, according to one embodiment.

FIGS. 3A and 3B show emulation compile flows yielding a bit level netlist, according to different embodiments. In terms of specific FPGA overlay architectures, presented are two example families of FPGA overlay architectures depending on which emulation compile flow is used. There are two emulation compile flows illustrated in FIGS. 3A and 3B. If the netlist is used before FPGA P&R as in FIG. 3A, the result would be a bit-level netlist. If the netlist is used before Tech Map as shown in FIG. 3B, the result would be a word-level netlist. The corresponding FPGA overlay architectures for bit-level netlist and word-level netlist are presented in Section 1 and Section 2 respectively below.

Section 1: FPGA Overly Architecture for Bit-Level Netlists

Figure 4:
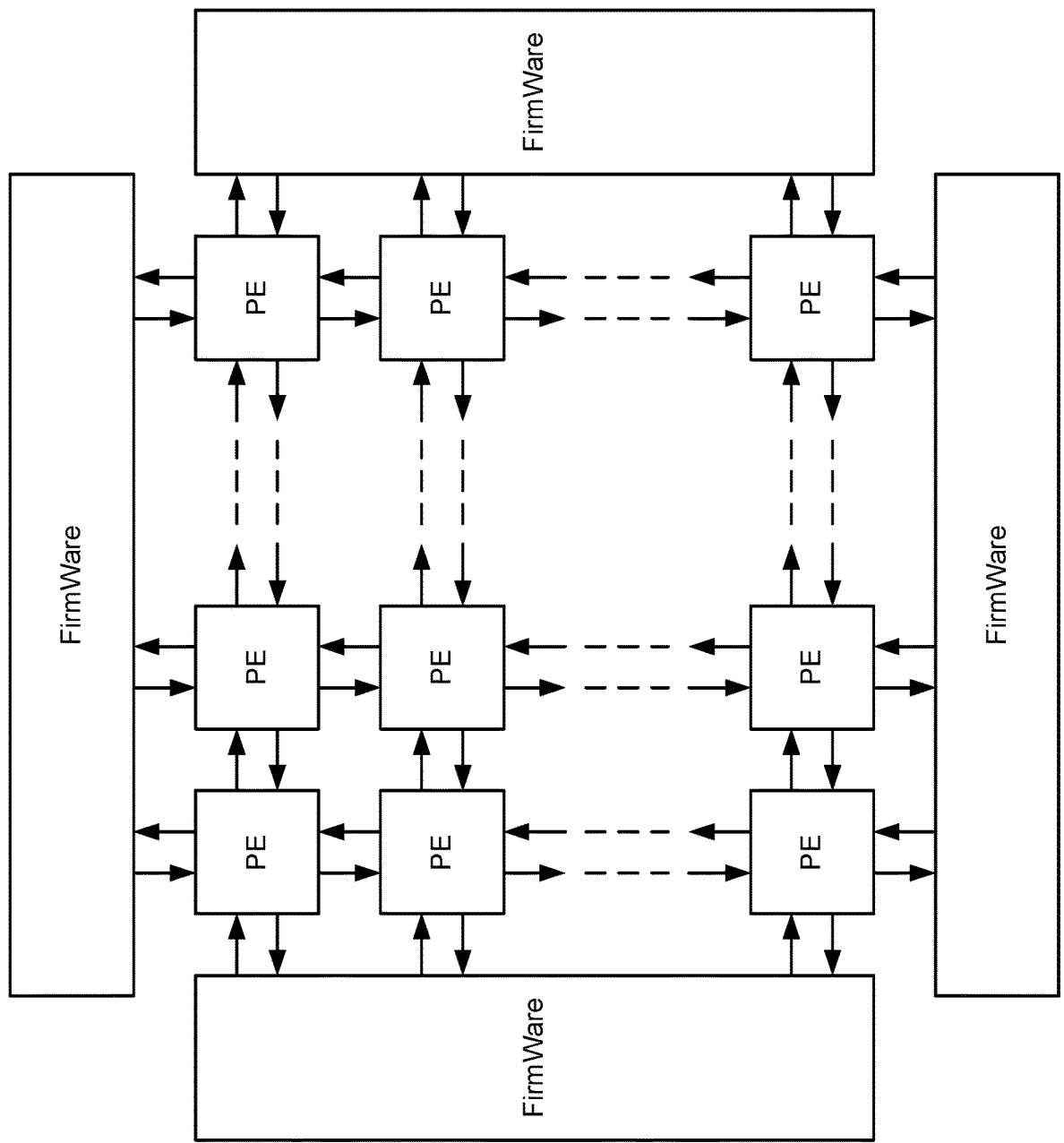
FIG. 4 shows CGRA style FPGA overlay architecture for emulation, according to one embodiment.

Presented in FIG. 4 is an CGRA style FPGA overlay architecture that can be used for bit level netlist emulation. The core of the architecture is a matrix of processing elements, each connected to its four nearest neighbors. The peripheral is surrounded by firm-ware circuit. This firmware, or FirmWare, is a non-programmable logic element included on the FPGA. The firm-ware circuit handles time-domain multiplexing (TDM), clocking and other miscellaneous functionalities. Block random access memories (block RAM or BRAM), zMems, digital signal processing (DSP) blocks or other special IP may also be inserted at various locations of the CGRA matrix. Each different configuration is a different architecture. This is an advantage over ASIC processor-based emulators because there is a choice among a pool of FPGA overlay architectures for each FPGA in the emulator.

Turning now to the processing element (PE) inside the CGRA style overlay architecture of FIG. 4, there are at least two kinds of processing elements:

Located along the border (including corners) of the matrix, or

Located at the inner regions of the matrix.

The following architecture is used for processing elements at the inner region of the matrix:

A logic unit that can take K inputs and a true-table to generate a single bit result. This is like a K-input Look-up Table (LUT) but there is no actual LUT.

An instruction buffer that stores N instructions. Each instruction has $2^K+M$ bits, where the $2^K$ bits constitute the truth table for the above K-input logic unit, and the extra M bits are used for control purposes.

There are R local registers with S bits. For simplicity, R=K and S=1 may be used.

A local memory with L depth and S bits wide.

Single bit input and output ports connected to the processing elements above, below, left, and right of the CGRA matrix.

Optionally, additional input or output ports connected to other places are available.

The additional input/output ports can be used for extra routing connectivity. For example, these CGRA processing elements can be grouped into clusters and these ports can be used to connect routing wires within the cluster. The instruction set can perform the following functionalities:

Take information from the input ports or the local registers and feed them to the output ports (effectively routing the data.)

Transfer data between the local memory and the local registers or the input/output ports. This involves memory read or write for the local memory.

Take information from the input ports or the local registers and feed them as input to the K-input logic unit to generate a Boolean result using the truth table specified by the instruction bits. Store the Boolean result in local register or send it to the output ports. For large K-input logic, only a subset of logic operations may be allowed.

Take information from the input ports or the local registers and perform one or more carry cell operation(s). Store the resultant bits in local register or send them to the output ports.

Note the instruction set size is impacted by the number K, as the truth table is encoded as part of the instruction operand. Hence, a small K (e.g. K=4) may be used or support a subset of logic operations if K is large. For carry cell, there is no truth table needed. Hence, we can allow more than one carry operation for the instruction set.

Optionally, processing elements can be implemented at the borders (including corners) of the matrix, and they can have multiple-bit input and output with the firmware as well as their nearest neighbors (e.g. with the neighbor processing element have matching ports). Their instruction sets are also modified to focus more on routing the data and less on the logic unit (or they do not even need a logic unit). Additional input or output ports are used to connect these border/corner processing elements to other processing elements in strategic locations at the inner region of the matrix, hence, these connections are not to the nearest neighbors. These additional connections will allow rapid routing of data to/from strategic locations of the matrix to enable better scheduling possibilities.

The following shows how this FPGA overlay architecture can implement the FPGA functionality in a typical emulator system. The content of a typical FPGA used for emulation is effectively firm-ware, special IPs, memories, DSPs, look-up tables (LUTs), carry cells and registers.

- LUTs in the original FPGA netlists can be implemented using the instructions that control the K-input logic unit of the processing element. Each instruction can perform one LUT function. There is a scheduler at emulation compile time to schedule the instructions into the various processing elements of the CGRA.
- Carry cells can be implemented using the carry instruction of the processing element. Since carry cells feed their carry out to the next carry cell, they can be easily rolled sequentially (by the scheduler) on to the same processing element.
- zMem's have multiple ports for read/write access. Traditional implementation of the zMem circuit may have a complex state machine to step through the ports sequentially using 50 MHz system clock so that they are ultimately on BRAM with only two ports. In our CGRA implementation, we can simply use the scheduler at compile time to sequentially fold the various read/write ports for the same BRAM. Hence, putting the complex state machine in the circuit can be avoided.
- Firm-ware, IPs, memories (other than zMem), DSPs can be connected to various input/output ports of the processing elements. Ideally, firm-ware is connected to the border of the matrix, while memories and DSPs should be connected to the inner region of the matrix using the additional input/output ports of processing elements.

The firm-ware socket responsible for time-domain multiplexing can be optimized for CGRA style architecture by:
1. Each processing element in the CGRA is supposed to execute many instructions representing many LUTs, meaning all the inputs/outputs do not have to be available together at any time instant. Only some of them need to be available, and if they are not available, the instructions may schedule to process them later in sequential order.
2. The firm-ware socket may be configurable as either input or output.

Figure 5:
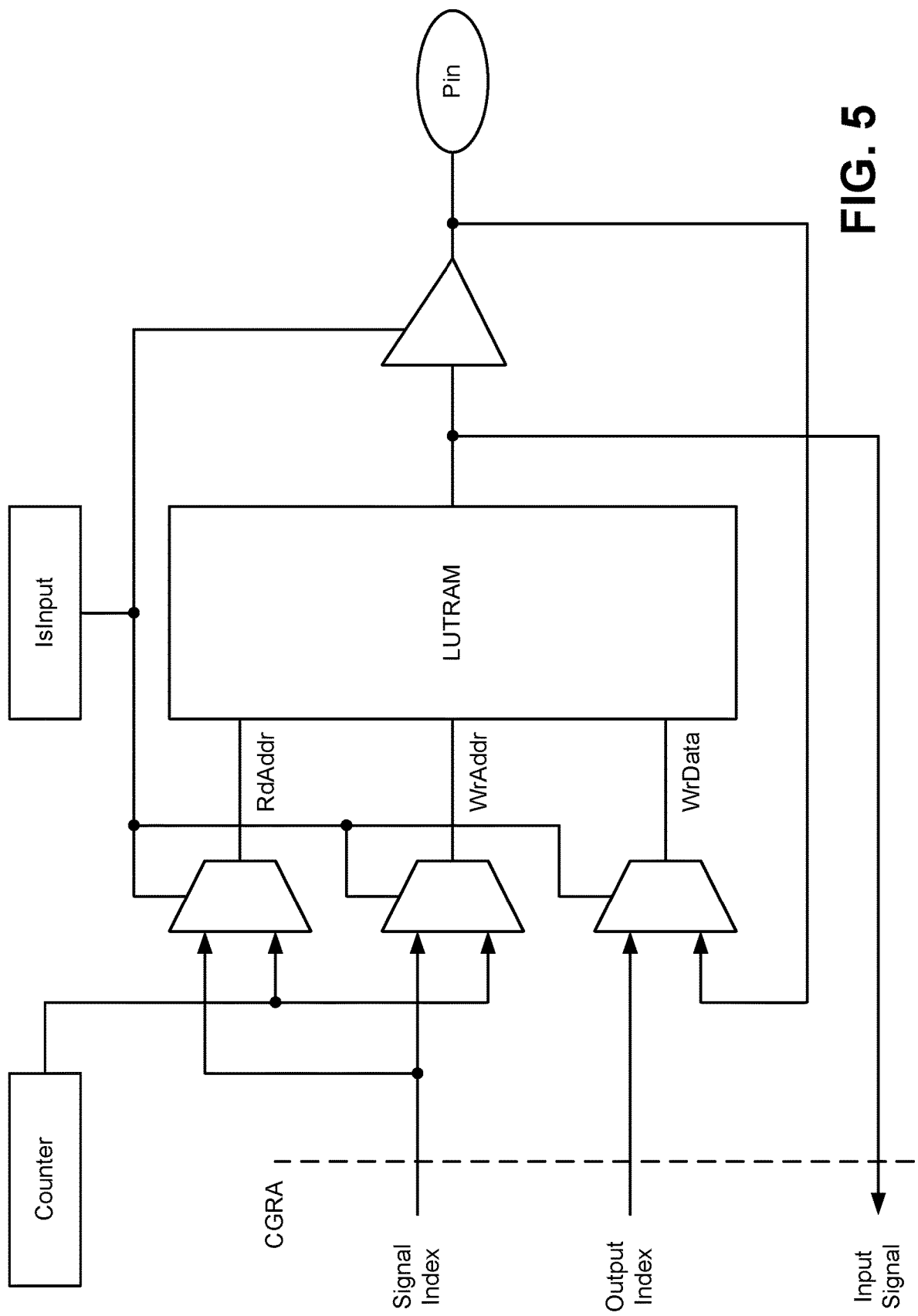
FIG. 5 shows a schematic of a Reconfigurable socket for TDM, according to one embodiment.

Reconfigurable firmware socket circuitry is shown in FIG. 5. There is a register called IsInput that indicates whether the socket is used for input or for output. If the bi-directional pin is used as input, it feeds the information to the memory, which is typically a lookup table RAM (LUTRAM), a BRAM, or registers. Otherwise if the bi-directional pin is used as output, the memory result is used to drive the bi-directional pin. The LUTRAM read address, write address and write data are being multiplexed using the IsInput value. The current figure shows only one pair of input/output with the CGRA. If there are multiple pairs of input/output with the CGRA, multiple memories are used for this purpose. These signal pairs to/from the CGRA do not need to connect only with the border processing elements. They can also connect to the inner regions at strategic locations.

For experiments, the central part of the CGRA style FPGA overlay architecture is implemented with K=4, N=512, R=4, S=1, L=16. Synplify Premier®, an FPGA design development tool by Synopsis, Inc of Mountain View, California is used to implement various matrix size configuration of the CGRA on Xilinx, Inc. Virtex® 7 V2000T FPGA, and the results are as follows:

| CGRA Matrix | LUTs | REGs | Frequency |
| --- | --- | --- | --- |
| 10 × 10 | 15201 | 2562 | 515.9 MHz |
| 30 × 30 | 188498 | 27472 | 452.7 MHz |
| 50 × 50 | 524512 | 75475 | 453.9 MHz |

For the 50×50 matrix, by multiplying the number of processing elements with the number of instructions, we obtain 1.28 million operations. Since Virtex® 7 V2000T itself has only 1.22 million LUTs, this is roughly sufficient to accommodate all the logic functions.

Figure 6:
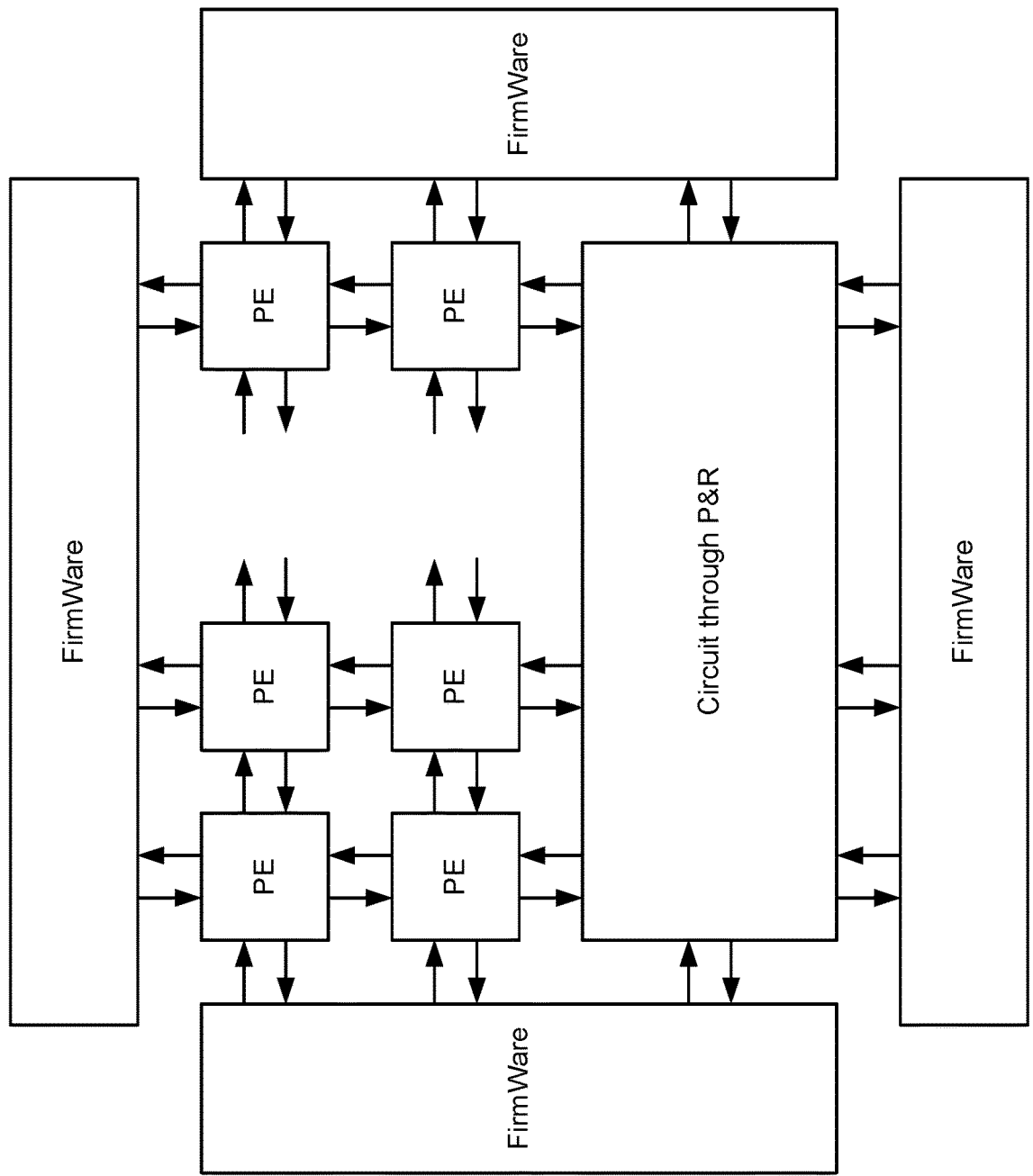
FIG. 6 shows an FPGA with Partial overlay, according to one embodiment.

Another embodiment considers FPGA with partial overlay, where part of the FPGA is already using overlay architecture and the remaining part will go through traditional place-and-route at emulation compile time, as shown in FIG. 6.

Section 2: FPGA Overly Architecture for Word-Level Netlists

For word-level netlists, the processing elements mentioned described above in Section 1 may be modified. Each processing element may not implement K-input logic function any more. Instead, they may support word-level operations similar to those defined in the Verilog and VHDL language. The processing elements may use multi-bit input/output ports to connect with their nearest neighbors, and the local registers and local memory should also be multi-bit wide.

Note the CGRA style is one set of FPGA overlay architectures. We can also use other FPGA overlay architectures for emulation: such as graphic processing unit (GPU) style or vector processor style architectures for FPGA overlay.

Computing Machine Architecture

Figure 7:
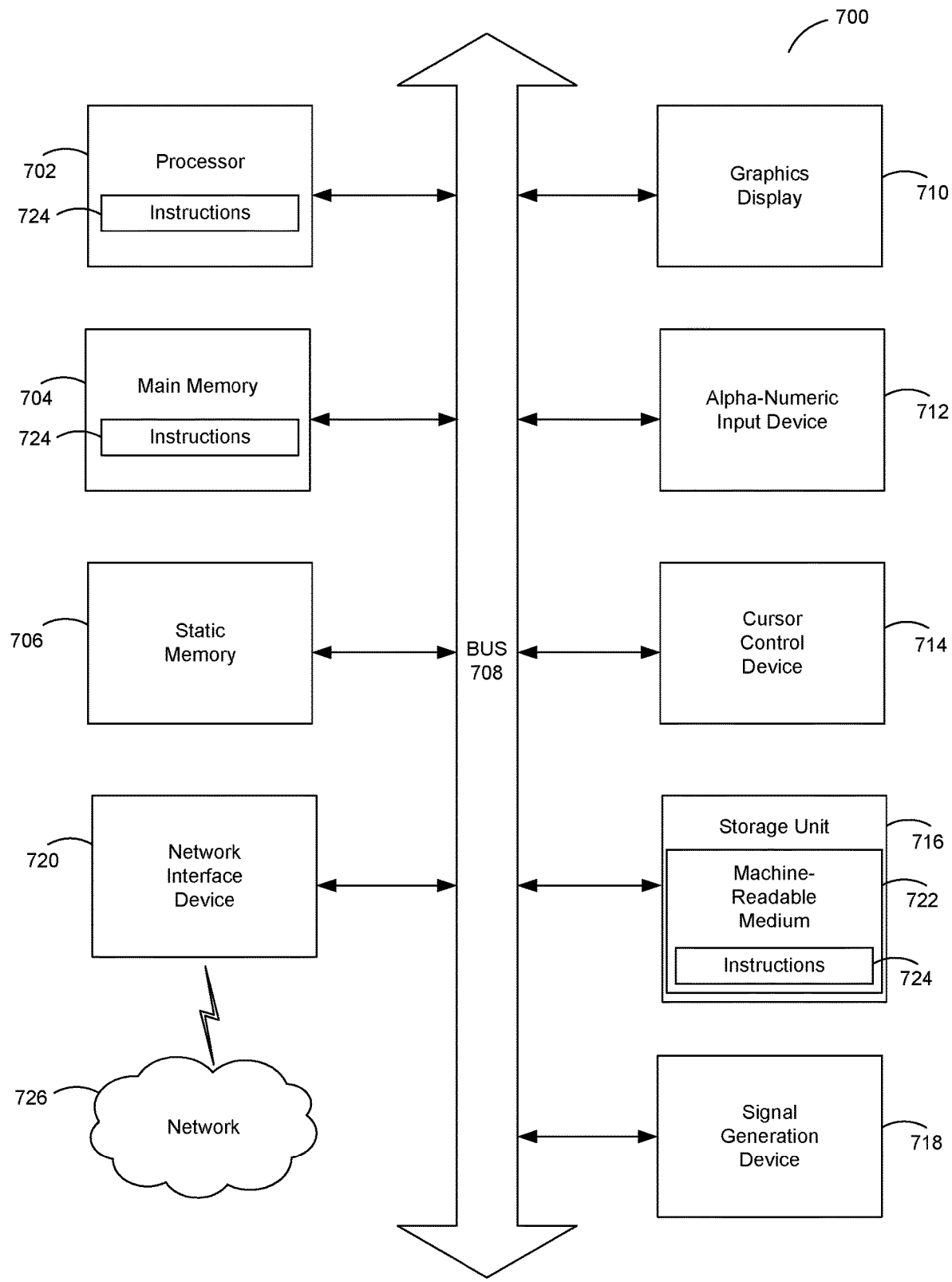
FIG. 7 shows components of an example machine that reads instructions from a machine-readable medium and execute them in a processor (or controller), according to one embodiment.

FIG. 7A is a block diagram illustrating components of an example machine able to read instructions from a machine-readable medium and execute them in a processor (or controller). Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 820, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Overview of EDA Design Flow

Figure 8:
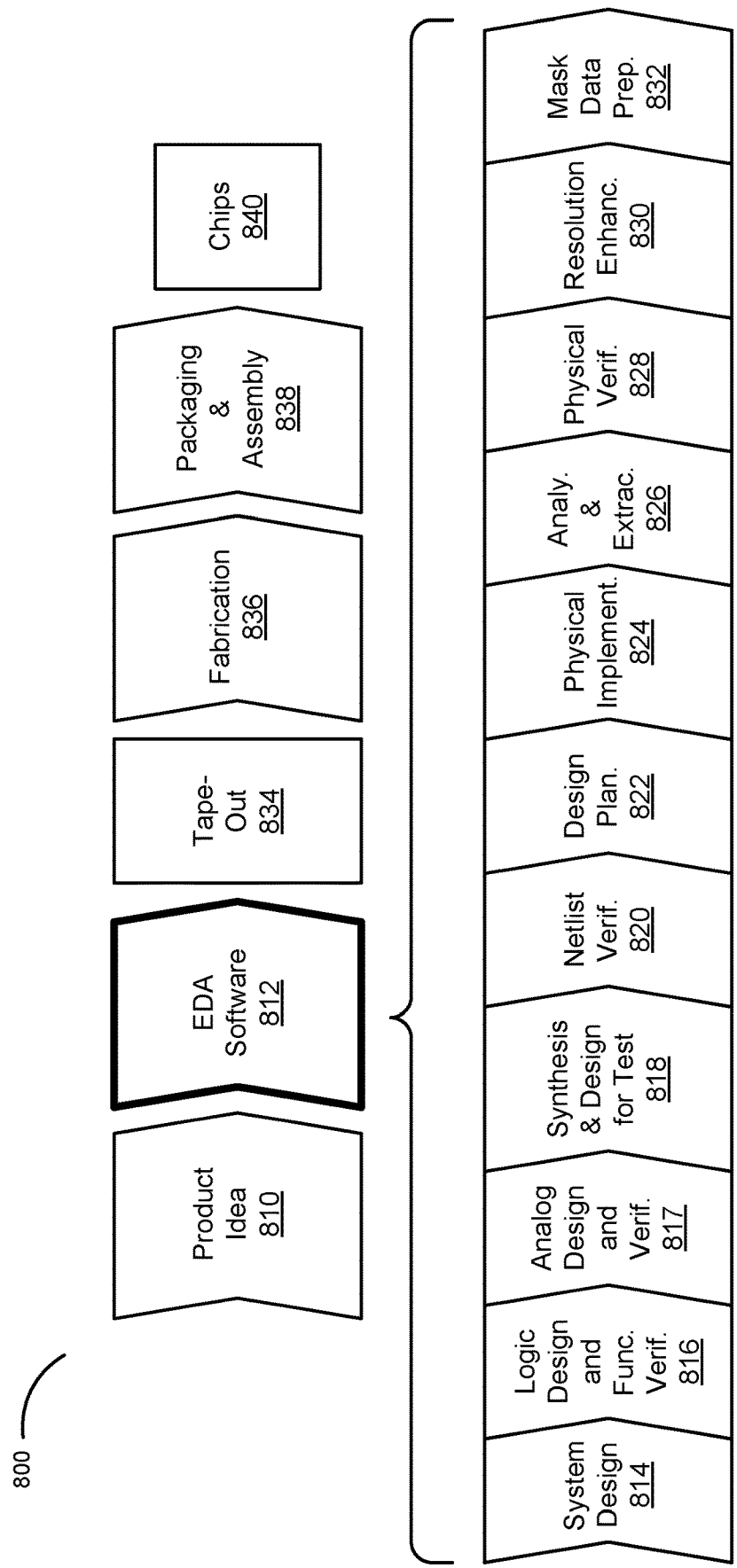
FIG. 8 depicts a block diagram of an emulation system, according to one embodiment.

FIG. 8 illustrates various processes performed in the design, verification and fabrication of an item of manufacture such as an integrated circuit using software tools with a computer, and possibly special hardware-assisted tools, to transform and verify design data and instructions that represent the integrated circuit. The steps disclosed hereinabove may be perform throughout the design, verification and fabrication process, for example, during the logic design and functional verification step.

These processes start with the generation of a product idea 810 with information supplied by a designer, information which is transformed during a process to create an item of manufacture (referred to herein as a design or device) that uses an EDA software tool 812, which may also be signified herein as EDA software, as a design tool, or a verification tool. When the design is finalized, it can be taped-out 834, which typically is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed, which result in the finished integrated circuit 840 which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses an EDA software tool 812 includes processes 814-832, which are described below. This design flow description is for illustration purposes only and is not meant to limit the present disclosure. For example, an actual integrated circuit design may require a designer to perform the design operations in a different sequence than the sequence described herein.

During system design 814, a designer describes the functionality to be manufactured. The designer can also perform what-if planning to refine the functionality and to check costs, etc. Hardware-software architecture partitioning can occur at this stage. Exemplary EDA software products from Synopsys, Inc. of Mountain View, California, that can be used at this stage include: Model Architect, Saber, System Studio, and Designware products.

During logic design and functional verification 816, modules in the circuit are specified in one or more hardware description languages, or HDLs, and the design in HDL is checked for functional accuracy, that is, to match the requirements of the specification of the circuit or system being designed to ensure that the design produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Exemplary EDA software products from Synopsys, Inc. of Mountain View, Calif. that can be used at this stage include: VCS®, Vera®, Designware®, Magellan®, Formality®, ESP® and Leda® products. Exemplary emulator and prototyping products also available from Synopsys that can be used at this state include: Zebu® and Protolink®.

During analog design, layout, and simulation 817, analog circuits are designed, laid out, and simulated to ensure both functionality and performance. Example EDA software products from Synopsys, Inc. of Mountain View, CA that can be used at this stage include: Custom Compiler®, Hspice®, HspiceRF®, XA®, Nanosim®, HSim®, and Finesim® products.

During synthesis and design for test 818, HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 820, the netlist is checked for compliance with timing constraints and for correspondence with the HDL code. Exemplary EDA software products from Synopsys, Inc. of Mountain View, Calif. that can be used at this stage include: Formality®, Primetime®, and VCS® products.

During design planning 822, an overall floor plan for the integrated circuit is constructed and analyzed for timing and top-level routing. Exemplary EDA software products from Synopsys, Inc. of Mountain View, Calif. that can be used at this stage include: Astro® and IC Compiler® products.

During layout implementation 824, the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif that can be used at this stage include: the Astro® and IC Compiler® products.

During analysis and extraction 826, the circuit function is verified at the layout level, which permits refinement of the layout design. Exemplary EDA software products from Synopsys, Inc. of Mountain View, Calif that can be used at this stage include: Astrorail®, Primerail®, Primetime®, and Star RC/XT® products.

During physical verification 828, the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules® product.

During resolution enhancement 830, geometric manipulations of the layout are performed to improve manufacturability of the design. Exemplary EDA software products from Synopsys, Inc. of Mountain View, Calif that can be used at this stage include: *Proteus*® products.

During tape-out, data is created to be used (after lithographic enhancements are applied if appropriate) for production of lithography masks. Example EDA software products from Synopsys, Inc., that can be used during tape-out include the IC Compiler® and Custom Designer® families of products.

During mask-data preparation 832, the 'tape-out' data is used to produce lithography masks that are used to produce finished integrated circuits. Exemplary EDA software products from Synopsys, Inc. of Mountain View, Calif. that can be used at this stage include the CATS® family of products.

Emulation Environment

Figure 9:
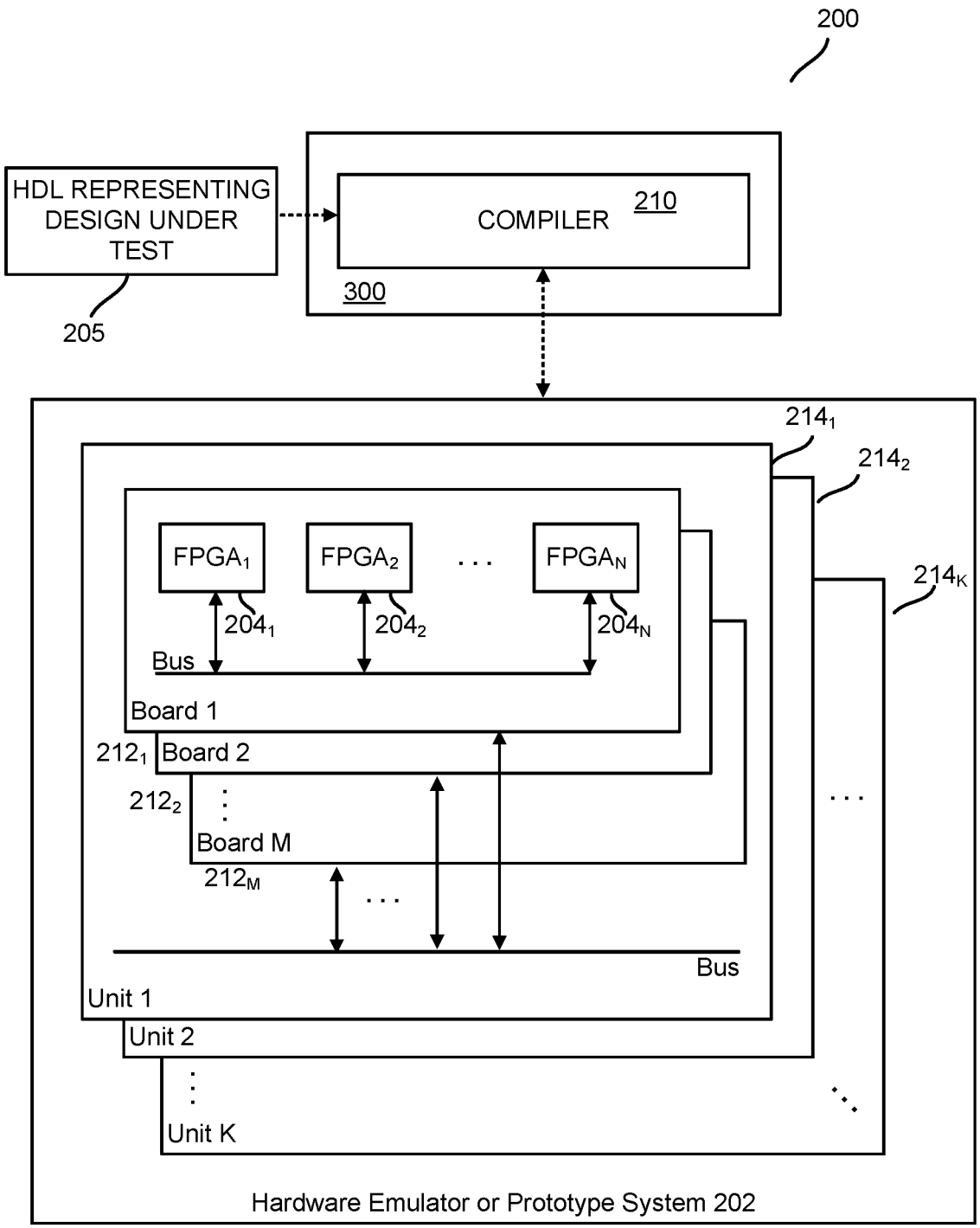
FIG. 9 shows a flowchart of various operations in the design and fabrication of an integrated circuit, according to one embodiment.

An EDA software system, such as element 812 depicted in FIG. 8, typically includes an emulation system 816 to verify the functionality of the circuit design. FIG. 9 depicts a typical emulation system which includes a host computer system 300 (often part of an EDA system) and an emulator system 202 (typically a set of programmable devices such as Field Programmable Gate Arrays (FPGAs)). The host system generates data and information, typically using a compiler 210, to configure the emulator to emulate a circuit design. One of more circuit designs to be emulated are referred to as a DUT (Design Under Test). The emulator is a hardware system that emulates a DUT, for example, to use the emulation results for verifying the functionality of the DUT. One example of an emulation system that can be used for the embodiments disclosed herein is the ZeBu Server available from Synopsys, Inc.

The host system 300 comprises one or more processors. In the embodiment where the host system is comprised of multiple processors, the functions described herein as being performed by the host system may be distributed among the multiple processors.

The host system 300 typically includes a compiler 210 that processes code written in a hardware description language that represents a DUT, producing data (typically binary) and information that is used to configure the emulation system 202 to emulate the DUT. The compiler 210 may transform, change, reconfigure, add new functions to, and/or control the timing of the DUT.

The host system and emulator exchange data and information using signals carried by an emulation connection. The connection can be one or more electrical cables, for example, cables with pin configurations compatible with the RS232 or USB protocols. The connection can be a wired communication medium or network, such as a local area network, or a wide area network such as the Internet. The connection can be a wireless communication medium or a network with one or more points of access, using a wireless protocol such as Bluetooth® or IEEE 802.11. The host system and emulator can exchange data and information through a third device, such as a network server.

The emulator includes multiple FPGAs (or other programmable devices), for example, elements $204_1$ to $204_N$ in FIG. 2. Each FPGA can include one or more FPGA interfaces through which the FPGA is connected to other FPGAs of the emulator (and potentially other emulator hardware components), in order for the FPGAs to exchange signals. An FPGA interface may also be referred to as an input/output pin or an FPGA pad. While some embodiments disclosed herein make use of emulators comprising FPGAs, other embodiments can include other types of logic blocks instead of, or along with, the FPGAs for emulating DUTs, for example, custom FPGAs, specialized ASICs for emulation or prototyping, memories, and input/output devices.

A programmable device may include an array of programmable logic blocks and a hierarchy of reconfigurable interconnects that allow the programmable logic blocks to be connected to each other according to the descriptions in the HDL code. Each of the programmable logic blocks can be configured to perform complex combinational functions, or merely simple logic gates, such as AND, and XOR logic blocks.

In many FPGAs, logic blocks also include memory elements, which may be simple latches, flip-flops or more complex blocks of memory. Depending on the length of the interconnections between different logic blocks, signals may arrive at input terminals of the logic blocks at different times.

Programmable processors $204_1$-$204_N$ may be placed into one or more hardware boards $212_1$ through $212_M$. Many of such boards may be placed into a hardware unit, e.g. $214_1$. The boards within a unit may be connected using the backplane of the unit or any other types of connections. In addition, multiple hardware units (e.g., $214_1$ through $214_K$) may be connected to each other by cables or any other means to form a multi-unit system. In general, the hardware emulation or prototype system 202 may be formed using a single board, a single unit with multiple boards, or with multiple units without departing from the teachings of the present disclosure.

For a DUT that is to be emulated, the emulator receives from the host system one or more bit files including a description of the DUT. The bit files further specify partitions of the DUT created by the host system with trace and injection logic, mappings of the partitions to the FPGAs of the emulator, and design constraints. Based on the bit files, the emulator configures the FPGAs to perform the functions of the DUT. With some emulators, one or more FPGAs of an emulator already have the trace and injection logic built into the silicon of the FPGA. For this type of emulator, the FPGAs don't have to be configured by the host system to emulate trace and injection logic.

The host system 110 receives (e.g., from a user or from a data store) a description of a DUT that is to be emulated. In one embodiment, the DUT description is in a hardware description language (HDL), such as register transfer language (RTL). In another embodiment, the DUT description is in netlist level files, or a mix of netlist level files and HDL files. If part of the DUT description or the entire DUT description is in a HDL, the host system synthesizes the DUT description to create a gate level netlist based on the DUT description. A host system can use the netlist of the DUT to partition the DUT into multiple partitions, with some of these partitions including trace and injection logic. The trace and injection logic traces interface signals exchanged via the interfaces of an FPGA. Additionally, the trace and injection logic can be used to inject traced interface signals into the logic of the FPGA. The host system maps each partition to an FPGA of the emulator. With some emulators, the trace and injection logic is only included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic was incorporated, the bit files also describe the incorporation of the logic. The bit files may also include place and route information and design constraints. The host system stores the bit files and also stores for components of the DUT information describing which FPGAs are to emulate each component of the DUT (to which FPGAs each component is mapped).

Upon request, the host system transmits the bit files to the emulator. The host system instructs the emulator to emulate the DUT. During emulation of the DUT or at the end of the emulation, the host system receives emulation results from the emulator through the emulation connection. Emulation results are data and information generated by the emulator based on the emulation of the DUT. The emulation results include interface signals (states of interface signals) traced by the trace and injection logic of each FPGA. The host system can stores the emulation results, or transmit them to another processing system.

After emulation of the DUT, a user may request to debug a component of the DUT. If such a request is made the user may provide a time period of the emulation to debug. The host system identifies which FPGAs are configured to emulate the component based on the stored information. The host system retrieves stored interface signals associated with the time period and traced by the trace and injection logic of each identified FPGA. The host system instructs the emulator to re-emulate the identified FPGAs, either one by one, multiple at a time, or altogether. The host system transmits the retrieved interface signals to the emulator in order to re-emulate the component for the time period. The trace and injection logic of each identified FPGA injects its respective interface signals received from the host system into the logic of the DUT mapped to the FPGA. In case of multiple re-emulations of an FPGA, the results may be merged all together to have a full debug view.

The host system receives from the emulator signals traced by logic of the identified FPGAs during the re-emulation of the component. The host system stores the signals received from the emulator. The signals traced during the re-emulation can have a higher sampling rate than during the initial emulation. For example, in the initial run a traced signal may be comprised of a saved hardware state every X milliseconds. However, in the re-emulation the traced signal may be comprised of a saved hardware state every Y milliseconds, where Y is less than X. If the user requests to view a waveform of a signal traced during the re-emulation, the host system can retrieve the stored signal and display a plot of the signal (generates a waveform of the signal). Afterwards the user can, for example, request to re-emulate the same component but for a different time period or to re-emulate another component.

A host system typically comprises at least seven sub-systems: a design synthesizer, a mapping module, a run time module, a results module, a debug module, a waveform module, and a storage module. Each of these sub-systems may be embodied as hardware, software, firmware, or a combination thereof. Together these components configure the emulator, and monitor the emulation results.

The design synthesizer converts the HDL of a DUT into gate level logic. For a DUT that is to be emulated, the design synthesizer receives a description of the DUT. If the description of the DUT is fully or partially in HDL (e.g., RTL or other level of abstraction), the design synthesizer 210 synthesizes the HDL of the DUT to create a gate-level netlist with a description of the DUT in terms of gate level logic.

The mapping module partitions DUTs and maps partitions to emulator FPGAs. The mapping module partitions a DUT at the gate level into a number of partitions using the netlist of the DUT. For each partition, the mapping module retrieves a gate level description of the trace and injection logic and incorporates the logic into the partition. As described above, the trace and injection logic included in a partition is configured to trace signals exchanged via the interfaces of an FPGA to which the partition is mapped (trace interface signals). The trace and injection logic can be incorporated into the DUT prior to the partitioning. For example, the trace and injection logic may be incorporated by the design synthesizer prior to or after the synthesizing the HDL of the DUT. Hence, the trace and injection logic may not match the partitions, it may be a subset, a superset or even different from the partitions.

In addition to including the trace and injection logic, the mapping module may include additional tracing logic in a partition in order to trace the states of certain DUT components that are not traced by the trace and injection logic (to trace signals other than the interface signals traced by the trace and injection logic). The mapping module may include the additional tracing logic in the DUT prior to the partitioning or in partitions after the partitioning. The design synthesizer can include the additional tracing logic in an HDL description of the DUT prior to synthesizing the description.

The mapping module maps each partition of the DUT to an FPGA of the emulator. The mapping module performs the partitioning and mapping using design rules, design constraints (e.g., timing or logic constraints), and information about the emulator. For components of the DUT, the mapping module stores information in the storage module describing which FPGAs are to emulate each component.

Based on the partitioning and the mapping, the mapping module generates one or more bit files that describe the created partitions and the mapping of logic to each FPGA of the emulator. The bit files may include additional information, such as constraints of the DUT, and routing information of connections between FPGAs and connections within each FPGA. The mapping module can generate a bit file for each partition of the DUT, which can be stored in the storage module. Upon request from a user, the mapping module transmits the bit files to the emulator, which the emulator uses to configure the FPGAs to emulate the DUT.

If the emulator includes specialized ASICs that include the trace and injection logic, the mapping module may generate a specific configuration allowing to connect them to the DUT or just save the information of what traced/injected signal is and where the information is stored on the specialized ASIC.

The run time module controls emulations performed on the emulator. The run time module may cause the emulator to start or stop executing an emulation. Additionally, the run time module may provide input signals/data to the emulator. The input signals may be provided directly to the emulator through the connection or indirectly through other input signal devices. For example, the host system with the run time module may control an input signal device to provide the input signals to the emulator. The input signal device may be, for example, a test board (directly or through cables), signal generator, another emulator, or another host system.

The results module processes emulation results generated by the emulator. During emulation and/or after completing the emulation, the results module receives emulation results from the emulator generated during the emulation. The emulation results include signals traced during the emulation. Specifically, the emulation results include interface signals traced by the trace and injection logic emulated by each FPGA. The emulation results may also include signals traced by additional logic included in the DUT. Each traced signal can span multiple cycles of the emulation. A traced signal is comprised of multiple hardware states and each hardware state is associated with a time of the emulation. The results module stores the traced signals received in the storage module. For each stored signal, the results module can store information indicating which FPGA generated the traced signal.

The debug module allows users to debug DUT components. After the emulator has emulated a DUT and the results module has received the interface signals traced by the trace and injection logic during the emulation, a user may request to debug a component of the DUT by re-emulating the component for a specific time period. In a request to debug a component, the user identifies the component and indicates a time period of the emulation to debug. The user's request can also include a sampling rate that indicates how often hardware states should be saved by logic that traces signals.

The debug module identifies the one or more FPGAs of the emulator that are configured to emulate the component based on the information stored by the mapping module in the storage module. For each identified FPGA, the debug module retrieves, from the storage module, interface signals traced by the trace and injection logic of the FPGA during the time period indicated by the user (i.e., retrieve hardware states traced by the trace and injection logic that are associated with the time period).

The debug module transmits the retrieved interface signals to the emulator. The debug module instructs the debug module to run the identified FPGAs and for the trace and injection logic of each identified FPGA to inject its respective traced signals into logic of the FPGA in order to re-emulate the component for the requested time period. The debug module can also transmit the sampling rate provided by the user to the emulator so that the tracing logic traces hardware states at the proper intervals.

To debug the component, the emulator only has to run the FPGAs to which the component has been mapped. Additionally, the re-emulation of the component does not have to start from the beginning but can start at any point desired by the user.

For an identified FPGA, the debug module can transmit instructions to the emulator to load multiple emulator FPGAs with the same configuration of the identified FPGA. The debug module additionally instructs the emulator to run the multiple FPGAs in parallel. Each FPGA from the multiple FPGAs is run with a different time window of the interface signals in order to generate a larger time window in a shorter amount of time. For example, for the identified FPGA to run a certain amount of cycles it may take an hour. However, if multiple FPGAs are loaded with the configuration of the identified FPGA and each of the FPGAs runs a subset of the cycles, it may only take a few minutes for the FPGAs to collectively run all of the cycles.

A user may identify a hierarchy or a list of DUT signals to re-emulate. To enable this, the debug module determines the FPGA needed to emulate the hierarchy or list of signals, retrieves the necessary interface signals and transmits the retrieved interface signals to the emulator for re-emulation. Hence, a user can identify any element (e.g., component or signal) of the DUT to debug/re-emulate.

The waveform module generates waveforms based on traced signals. If a user requests to view a waveform of a signal traced during an emulation run, the host system retrieves the signal from the storage module. The waveform module displays a plot of the signal to the user. For one or more signals, when the signals are received from the emulator, the waveform module can automatically generate the plots of the signals.

Additional Configuration Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs through the disclosed principles of the embodiments. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method for emulating a design of an electronic circuit, the method comprising:
   executing a netlist of a set of field-programmable gate array (FPGA) overlays for a design of an electronic circuit;
   executing through an emulator a first place-and-route operation for a first portion of the netlist having a critical timing path to substitute a first set of placed and routed FPGAs into a first set of logic elements of the design of the electronic circuit to generate a first updated netlist corresponding to a first updated design of the electronic circuit;
   executing through the emulator the first updated netlist and concurrently executing a second place-and-route operation for a second portion of the netlist separate from the critical timing path to substitute a second set of placed and routed FPGAs into a second set of logic elements of the electronic circuit to generate a second updated netlist;
   interconnecting the first set of placed and routed FPGAs and the second set of placed and routed FPGAs to implement a second updated design of the electronic circuit; and
   executing through the emulator the second updated design of the electronic circuit using the interconnected first placed and routed FPGAs and FPGAs the second placed and routed FPGAs.

2. The method of claim 1, further comprising:
   implementing a subset of logic element of the first set of logic elements in a third set of FPGAs;
   replacing at least a subset of FPGA overlays from the first set of FPGA overlays with the third set of FPGAs; and
   testing the design of the electronic circuit using the third set of FPGAs.

3. The method of claim 2, wherein the implementation of the subset of logic elements in the third set of FPGAs runs faster than the implementation of the subset of logic elements in the first set of FPGA overlays.

4. The method of claim 1, further comprising:
   configuring a plurality of reconfigurable firmware sockets of the first set of FPGA overlays.

5. The method of claim 4, wherein configuring the plurality of reconfigurable firmware sockets comprises:
   for each reconfigurable firmware socket, storing an indication of whether the reconfigurable firmware socket is an input socket or an output socket.

6. The method of claim 5, wherein the indication is stored in a register of the reconfigurable firmware socket.

7. An emulation system for emulating a design of an electronic circuit comprising:
   one or more field-programmable gate array (FPGA) overlays implementing a set of logic elements of the design of the electronic circuit, the FPGA overlays comprising one or more programmable architectures;
   a first set of placed and routed FPGAs implementing a first subset of logic elements of the design of the electronic circuit to generate a first updated design based on performing a first place-and-route operation within the set of logic elements, wherein the first subset of logic elements is associated with a critical timing path, the first subset of placed and routed FPGAs replacing a first portion of the set of logic elements having the critical timing path;
   a second set of placed and routed FPGAs implementing a second subset of logic elements of the design of the electronic circuit based on executing the first updated design and concurrently performing a second place-and-route operation within the set of logic elements, the second subset of logic elements separate from the critical timing path, the second set of placed and routed FPGAs replacing a second portion of the set of logic elements separate from the critical timing path; and
   an emulation board interconnecting the first subset of placed and routed FPGAs, the second set of placed and routed FPGAs, and a remainder of the design of the electronic circuit.

8. The emulation system of claim 7, wherein the remainder of the one or more FPGA overlays further comprising:
   one or more additional FPGAs implementing a third subset of logic elements of the set of logic elements.

9. The emulation system of claim 7, wherein the one or more FPGA overlays comprise:
   a reconfigurable firmware socket including:
   a register storing a value indicative of whether the reconfigurable firmware socket behaves as an input socket or as an output socket.

10. The emulation system of claim 9, wherein the reconfigurable firmware socket further comprises:
    one or more multiplexers controlled by an output of the register; and
    a driver for driving an output signal to a pin of the reconfigurable firmware socket, wherein the driver is turned on or off by the output of the register.

11. The emulation system of claim 10, wherein the driver is configured to turn on when the reconfigurable firmware socket is configured to behave as an output socket.

12. The emulation system of claim 10, wherein the driver is configured to turn off when the reconfigurable firmware socket is configured to behave as an input socket.

13. The emulation system of claim 9, wherein the reconfigurable firmware socket further comprises:
    a memory configured to store information received through a pin of the reconfigurable firmware socket when the reconfigurable firmware socket is configured to behave as an input socket.

14. The emulation system of claim 7, further comprising:
    a compiler configured to generate the first set of placed and routed FPGAs and the second set of placed and routed FPGAs.

15. The emulation system of claim 14, wherein the compiler is further configured to place and route at least a subset of logic elements of the first set of logic elements after the placement and routing of the second set of logic elements is completed.

16. A non-transitory computer readable storage medium comprising instruction that when executed by a processor, cause the processor to:
  program one or more field-programmable gate array (FPGA) overlays to implement a first set of logic elements of a design of an electronic circuit, the FPGA overlays comprising one or more programmable architectures;
  execute a first place-and-route operation for a first set of FPGAs corresponding to a critical timing path of the electronic circuit to generate a first updated design;
  execute the first update design and the FPGA overlay of the electronic circuit and concurrently execute a second place-and-route operation for a second set of logic elements of the electronic circuit in a second set of FPGAs separate from the critical timing path; and
  test the design of the electronic circuit using the FPGA overlays and the second set of FPGAs.

* * * * *